US012695947B2

(12) United States Patent
Robert Jose et al.

(10) Patent No.: US 12,695,947 B2
(45) Date of Patent: *Jul. 28, 2026

(54) SYSTEM AND METHOD FOR SELECTION OF SUPPLEMENTAL CONTENT ACCORDING TO SKIP LIKELIHOOD

(71) Applicant: Adeia Guides Inc., San Jose, CA (US)

(72) Inventors: Jeffry Copps Robert Jose, Chennai (IN); Ankur Anil Aher, Kalyan (IN); Cato Yang, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/984,214

(22) Filed: Dec. 17, 2024

(65) Prior Publication Data

US 2025/0119616 A1 Apr. 10, 2025

Related U.S. Application Data

(63) Continuation of application No. 18/385,182, filed on Oct. 30, 2023, now Pat. No. 12,206,941, which is a
(Continued)

(51) Int. Cl.
| | |
|---|---|
| *H04N 21/44* | (2011.01) |
| *H04N 21/442* | (2011.01) |
| *H04N 21/45* | (2011.01) |
| *H04N 21/458* | (2011.01) |
| *H04N 21/472* | (2011.01) |
| *H04N 21/81* | (2011.01) |

(52) U.S. Cl.
CPC ... *H04N 21/44218* (2013.01); *H04N 21/4532* (2013.01); *H04N 21/458* (2013.01); *H04N 21/47217* (2013.01); *H04N 21/812* (2013.01)

(58) Field of Classification Search
CPC ......... H04N 21/44218; H04N 21/4532; H04N 21/458; H04N 21/47217; H04N 21/812
See application file for complete search history.

(56) References Cited

U.S. PATENT DOCUMENTS

| | | | | |
|---|---|---|---|---|
| 8,468,056 B1 * | 6/2013 | Chalawsky | ............ | G06Q 30/02 |
| | | | | 705/14.42 |
| 8,515,128 B1 * | 8/2013 | Hildreth | ................ | G06F 3/0421 |
| | | | | 382/103 |

(Continued)

*Primary Examiner* — Timothy R Newlin
(74) *Attorney, Agent, or Firm* — HG LAW LLP

(57) ABSTRACT

Systems and methods for a computer-based process that determines when a viewer is likely to skip over supplemental content and adjusts supplemental content presentation to compensate. Systems of embodiments of the disclosure may utilize various inputs to determine the likelihood of skipping supplemental content, including cursor position at or near specified icons or other UI elements, as well as user actions such as gaze direction, various motions or actions, controller manipulations, and the like. Once a likelihood of skipping supplemental content is determined, various actions may be taken in response, including without limitation selection of supplemental content that conveys its intended message prior to skipping, supplemental content that can be played at increased speed, and designation of supplemental content slots as skippable or non-skippable.

20 Claims, 12 Drawing Sheets

Related U.S. Application Data continuation of application No. 17/500,417, filed on Oct. 13, 2021, now Pat. No. 11,930,247.

(56) References Cited

U.S. PATENT DOCUMENTS

| | | | |
|---|---|---|---|
| 11,606,609 B1 | 3/2023 | Robert Jose et al. | |
| 11,930,247 B2 | 3/2024 | Robert Jose et al. | |
| 11,968,424 B2 | 4/2024 | Robert Jose et al. | |
| 2002/0178447 A1* | 11/2002 | Plotnick | H04N 21/25435 |
| | | | 348/E7.071 |
| 2003/0149975 A1* | 8/2003 | Eldering | H04N 21/4532 |
| | | | 348/E7.071 |
| 2008/0256572 A1* | 10/2008 | Chen | H04N 21/4858 |
| | | | 725/32 |
| 2009/0172723 A1* | 7/2009 | Shkedi | H04N 21/4312 |
| | | | 725/32 |
| 2010/0325660 A1* | 12/2010 | Holden | H04N 21/2387 |
| | | | 725/34 |
| 2011/0078740 A1* | 3/2011 | Bolyukh | H04N 21/812 |
| | | | 725/41 |
| 2011/0112914 A1* | 5/2011 | Geer, III | G06Q 30/00 |
| | | | 705/14.73 |
| 2011/0321084 A1* | 12/2011 | Takahashi | H04N 5/2723 |
| | | | 725/32 |
| 2014/0259032 A1* | 9/2014 | Zimmerman | G06Q 30/0224 |
| | | | 725/9 |
| 2015/0054820 A1* | 2/2015 | Ji | G06F 3/038 |
| | | | 345/418 |
| 2015/0067722 A1* | 3/2015 | Bjordammen | H04N 21/812 |
| | | | 725/32 |
| 2015/0356622 A1* | 12/2015 | Dhawan | G06Q 30/0269 |
| | | | 705/14.66 |
| 2016/0112737 A1* | 4/2016 | Johnston | H04N 21/25891 |
| | | | 725/14 |
| 2016/0179463 A1* | 6/2016 | Higa | H04N 21/42213 |
| | | | 725/52 |
| 2019/0050486 A1* | 2/2019 | Ramachandra Iyer | H04N 21/26258 |
| 2019/0141406 A1* | 5/2019 | Casagrande | H04N 21/4888 |
| 2019/0281333 A1* | 9/2019 | Liu | H04N 21/251 |
| 2020/0099983 A1* | 3/2020 | Hao | H04N 21/44209 |
| 2021/0146241 A1* | 5/2021 | Bleasdale-Shepherd | G06N 20/00 |
| 2021/0227296 A1* | 7/2021 | Casal Gomez | H04N 21/237 |
| 2021/0306686 A1* | 9/2021 | Link | H04N 21/26258 |
| 2022/0057865 A1* | 2/2022 | Ballagas | G06F 3/015 |
| 2022/0174336 A1* | 6/2022 | Hardee | H04N 21/2387 |
| 2022/0321940 A1* | 10/2022 | Christie | H04N 21/812 |
| 2023/0110586 A1 | 4/2023 | Robert Jose et al. | |
| 2023/0269424 A1 | 8/2023 | Robert Jose et al. | |
| 2024/0089535 A1 | 3/2024 | Robert Jose et al. | |

* cited by examiner

300

310 — User Input Interface

312 — Display

314 — Speakers

Processing Circuitry — 306

304

302

Storage (e.g., RAM, ROM, Hard Disk, — 308

| Skippable | Non-Skippable | Skippable | Non-Skippable |
|---|---|---|---|
| Scheduled for 5:00 | Scheduled for 10:00 | Scheduled for 15:00 | Scheduled for 25:00 |

▷  ⇨  0.00/15:34                                ⊙ ⚙ □ ⌞⌝

5:00

At 4:55 Determine
Low Likelihood of Skip

↓

Modify
Schedule

↓

| Non-Skippable | Skippable | Skippable | Non-Skippable |
|---|---|---|---|
| Scheduled for 5:00 | Scheduled for 10:00 | Scheduled for 15:00 | Scheduled for 25:00 |

SYSTEM AND METHOD FOR SELECTION OF SUPPLEMENTAL CONTENT ACCORDING TO SKIP LIKELIHOOD

CROSS-REFERENCE TO RELATED APPLICATIONS

This application is a continuation of U.S. patent application Ser. No. 18/385,182, filed Oct. 30, 2023, which is a continuation of U.S. patent application Ser. No. 17/500,417, filed Oct. 13, 2021, now U.S. Pat. No. 11,930,247, the disclosures of which are hereby incorporated by reference herein in their entireties.

BACKGROUND

Embodiments of the disclosure are directed generally to electronic content display systems and methods. Embodiments of the disclosure are directed more specifically to systems and methods for selection of supplemental content according to skip likelihood.

SUMMARY

Many electronic content display systems allow users to skip supplemental content (e.g., content shown in addition to main content being consumed) after a specified amount of time. For example, users may be permitted to skip supplemental content after it has played for 5 seconds, such as via selecting a "Skip" button displayed on-screen.

Allowing users to skip supplemental content presents certain challenges, however. In particular, a supplemental content's intended message is often not conveyed to the viewer, at least not in complete form. Further, skipped supplemental content results in fewer views of that supplemental content, which may in turn result in lower revenue generated, fewer products sold, and the like.

Accordingly, to overcome the limited ability of computer-based content display systems to convey supplemental content when skipping such content is allowed, systems and methods are described herein for a computer-based system and process that predicts when a viewer is likely to skip an advertisement or other supplemental content, and adjusts supplemental content presentation to compensate. Systems of embodiments of the disclosure may predict user intent to skip either before the supplemental content is presented, or shortly after the supplemental content is presented. Once a likelihood of skipping content is determined, the system may take any compensatory action, such as selecting different supplemental content that is shorter or conveys its intended message prior to being skipped, disallowing a user skip, or the like.

In some embodiments of the disclosure, during display of a content item, systems may identify and optionally display times at which content play is to be interrupted by display of supplemental content such as advertisements, e.g., paused while supplemental content is overlaid on the same screen, and resumed once play of the supplemental content is complete. Various user actions approaching or soon after these times may be employed as inputs used to predict a likelihood that the user intends to skip this supplemental content. When it is determined that the user is likely to select his or her option to skip, the system may respond by selecting a particular supplemental content item to compensate and may transmit this selected content for display to the user. The selected supplemental content may be content that displays its intended message quickly, before the user can skip. For example, the system may select an advertisement with the product name, picture, and logo prominently displayed in its opening frames. As another example, very short supplemental content may be selected, or supplemental content may be selected for playback at increased speed, so that it may be completed before the user's skip command is entered. As a further example, only a portion of supplemental content may be selected, such as a still image, a text summary, or short clip that may be completed quickly.

Selection of supplemental content may be performed based on a likelihood of skipping content, when the likelihood exceeds some threshold value. That is, supplemental content may be selected when it is deemed sufficiently likely that the user is going to attempt to exercise his or her skip option. In particular, in some embodiments, one supplemental content item may be selected when the likelihood of skipping exceeds this threshold value, while another supplemental content item may be selected when the likelihood does not exceed the threshold. Thus, for example, if it is determined that the user likely does not intend to skip a supplemental content item, the system may continue with display of the originally intended supplemental content. Conversely, if it is determined that the user likely intends to skip the supplemental content, another supplemental content item may instead be selected with, e.g., an intended message shown at its beginning. Any threshold having any value or values may be employed, and any supplemental content may be selected.

Skip likelihood may be determined in any manner. In some embodiments, skip likelihood may be based on cursor position, and more specifically cursor positioning over the location of a user interface (UI) element that presents the user with the option to skip supplemental content. As one example, display systems may present users with a "Skip in X Seconds" icon or element, which a user can select by directing a cursor thereover and selecting with a controller button push when X seconds have elapsed. In this example, a user may attempt to preemptively move his or her cursor over the "Skip" icon before its time has expired, to prepare for selecting the icon as soon as it is possible to do so. Accordingly, systems of embodiments of the disclosure may consider this action as an indication that the user intends to skip the upcoming supplemental content. Similarly, other actions may also be used to determine skip intent, such as eye gaze directed at the "Skip" icon just before or otherwise prior to timer expiration, the user's hand or other body part moved to be positioned over a controller just before timer expiration and thus indicating intent to skip, pressure applied to a controller button just before timer expiration, movement of the controller itself, or any other action that may be detectable by a system and may be indicative of intent to skip.

Likewise, any of these actions may be performed before the "Skip" icon appears, also indicating intent to skip. Thus, for example, moving a cursor to the screen location where the "Skip" icon may soon appear may be deemed likely to indicate intent to skip when the option to do so appears. Any of the above remaining actions (eye gaze, button pressure, hand movement, controller movement, etc.) may also be deemed as indicating likelihood of intent to skip upcoming supplemental content.

In some embodiments, the UI element provides a control to, for example, close a browser tab in which the content item is being displayed, select a different browser tab from the browser tab in which the content item is being displayed, select a different content item in a playlist, and/or mute audio of the content item or browser tab in which the content item is being displayed.

Intent to skip may also be determined from past patterns of viewer behavior. More specifically, user information such as a user profile may be compiled, storing a user's past behavior as it relates to skip likelihood. This profile may then be retrieved from its storage and used to determine or help determine skip likelihood. User profile information may be any information that may indicate skip likelihood, such as the frequency users have skipped advertisements or other supplemental content in the past, types of supplemental content skipped and not skipped, metadata of previously viewed supplemental content that may indicate attributes such as product types whose ads were skipped, brands whose ads were skipped and not skipped, times of day ads were skipped, positions within displayed content at which ads were skipped or not skipped, and the like.

In some embodiments of the disclosure, systems may react to a likelihood of skipping content by designating that content slot as skippable or non-skippable. Any designation is contemplated in response to determined skip likelihood. For example, ad creators, content distributors, or the like may wish to designate ad slots as non-skippable upon determining that the viewer wishes to skip an upcoming ad, thus increasing the likelihood that the viewer will see the ad. Conversely, viewers may wish that ad slots are designated as skippable anytime an ad is intended to be skipped, thus reducing the number of ads the viewer is forced to view, and improving the viewer's experience.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for a computer-based process that determines when a viewer is likely to skip over supplemental content, and adjusts supplemental content presentation to compensate. Systems of embodiments of the disclosure may utilize various inputs to determine the likelihood of skipping supplemental content, including cursor position at or near specified icons or other UI elements, as well as user actions such as gaze direction, various motions or actions, controller manipulations, and the like. Once a likelihood of skipping supplemental content is determined, various actions may be taken in response, including without limitation selection of supplemental content that conveys its intended message prior to skipping, playing of supplemental content at increased speed, and designation of supplemental content slots as skippable or non-skippable.

Figure 1:
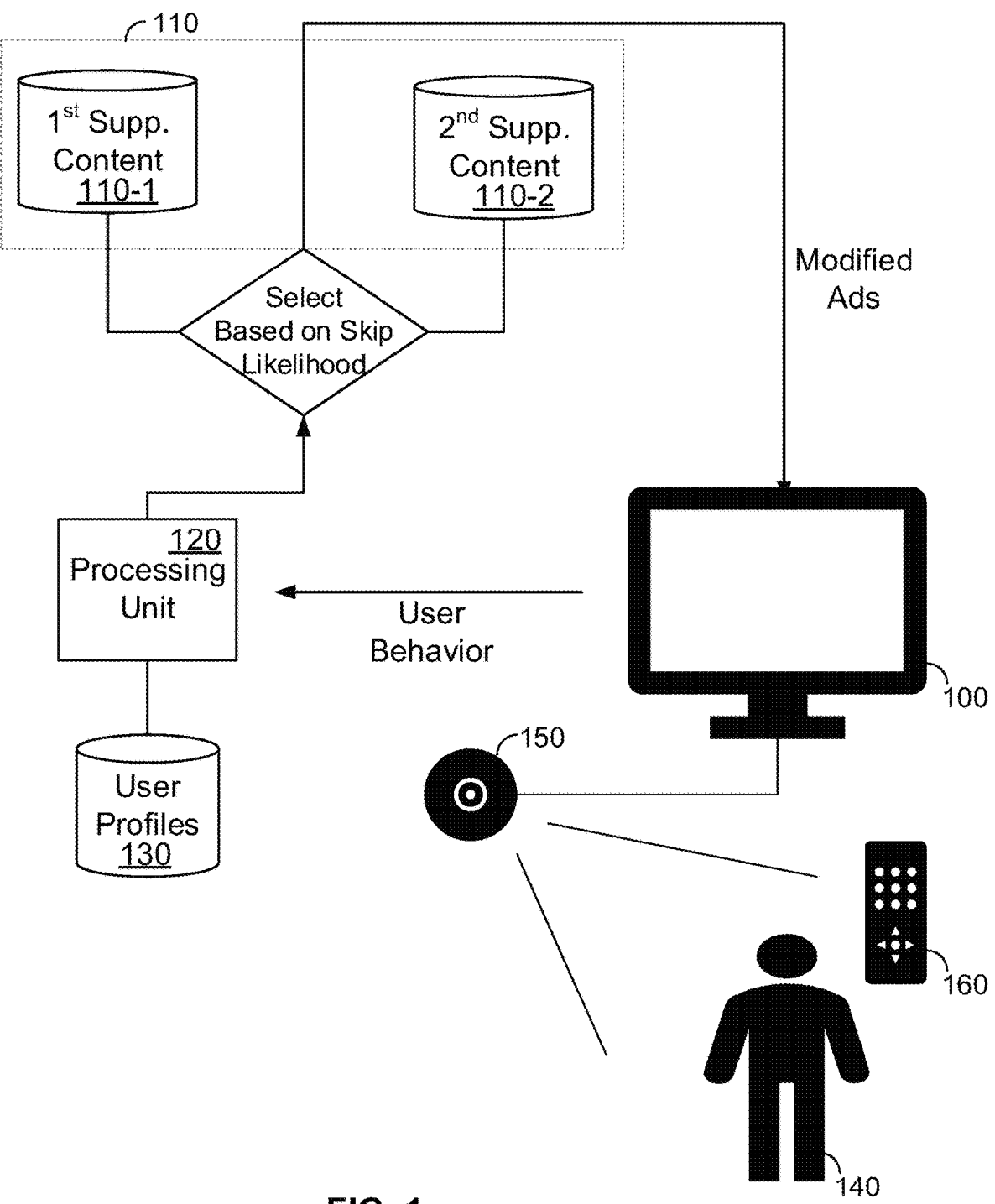
FIG. 1 illustrates operation of an exemplary system for selecting supplemental content according to skip likelihood, in accordance with some embodiments of the disclosure.

FIG. 1 illustrates operation of an exemplary system for selecting supplemental content according to skip likelihood, in accordance with some embodiments of the disclosure. Here, a display 100 may display content from storage 110 via processing unit 120. Storage 110 may store content to be retrieved for display on display 100, as well as supplemental content 110-1 and 110-2. Processing unit 120 may determine whether viewer 140 is likely to skip supplemental content such as advertisements and select alternative supplemental content from storages 110-1 or 110-2 for display to the viewer 140 instead. Processor 120 may determine the likelihood of viewer 140 skipping supplemental content in any manner and using any inputs. In some embodiments of the disclosure, these inputs may include information retrieved from user profile storage 130, camera 150, controller 160, and display 100. For example, such inputs may include the position of a cursor rendered on display 100 and controlled by viewer 140. Positioning of the cursor on a "Skip Ad" icon or other UI element (e.g., a UI element to close a browser tab in which the content item is being displayed, a UI element to select a different browser tab from the browser tab in which the content item is being displayed, a UI element to play a different content item in a playlist, or a UI element to mute audio of the content item or browser tab in which the content item is being displayed) by viewer 140 may indicate an intent of viewer 140 to skip or otherwise avoid viewing an ad, and/or to avoid playing audio of the ad. Further inputs may include viewer 140 position or actions, as detected by camera 150. For instance, camera 150 may capture images of viewer 140 grasping controller 160, indicating an intent to use the controller 160 to skip an advertisement and/or change a channel. Camera 150 may also capture images of viewer 140 performing certain gestures or actions characteristic of an intent to skip supplemental content, such as a waving of a hand, pointing to a portion of display 100 corresponding to a "Skip Ad" icon, or the like. Controller 160 may further include sensors to detect pressure applied by viewer 140 upon any buttons, indicating an intent to press one of the buttons to command display 100 to skip an advertisement and/or change a channel, for instance. These sensors may also detect motion of controller 160, indicating that it has been picked up by viewer 140 to skip supplemental content. In some embodiments of the disclosure, controller 160 may be any device capable of issuing any commands to display 100 and/or processing unit 120 directly or indirectly, such a dedicated remote controller, a smartphone, a laptop computer or other computing device, or the like. In some embodiments, camera 150 may be physically separate from but communicatively coupled to display 100, or may be incorporated into any devices such as display 100, controller 160, and the like. As one example, controller 160 may be a smartphone and camera 150 may be an internal camera of this smartphone.

Processing unit 120 may additionally retrieve information on viewer 140 from user profile storage 130, where the retrieved information is indicative of a skip history of viewer 140. For example, retrieved information may include data such as the frequency users have skipped advertisements or other supplemental content in the past, and information on supplemental content skipped and not skipped, such as the lengths or other attributes of skipped and not skipped content. Information may also include metadata of previously viewed supplemental content that may indicate attributes such as product types whose ads were skipped and not skipped, brands whose ads were skipped and not skipped, skipped content genres or other subject matter, times of day ads were skipped and not skipped, positions within displayed content at which ads were skipped or not skipped, and the like. Stored user information may include any type and quantity of information that may help indicate a skip likelihood.

Once processing unit 120 has determined whether viewer 140 is likely to skip supplemental content, it may select supplemental content accordingly. For example, if processing unit 120 determines that viewer 140 is unlikely to skip upcoming supplemental content, it may select content from first supplemental content storage 110-1 for display on display 100. In this example, first supplemental content storage 100-1 may contain the supplemental content originally intended for display in that particular content slot. That is, if viewer 140 is not deemed likely to skip supplemental content, processing unit 120 may proceed with display of the supplemental content as originally intended. Conversely, if processing unit 120 determines that viewer 140 is likely to skip upcoming supplemental content, it may instead select content from second supplemental content storage 110-2 for display on display 100. As above, second supplemental content storage 110-2 may contain supplemental content tailored to viewers likely to skip such content. This content may, for example, be supplemental content that conveys its intended message rapidly, such as short ads, still frames of a product, ads with product information and/or appealing images in its first few frames, or the like.

Figure 2:
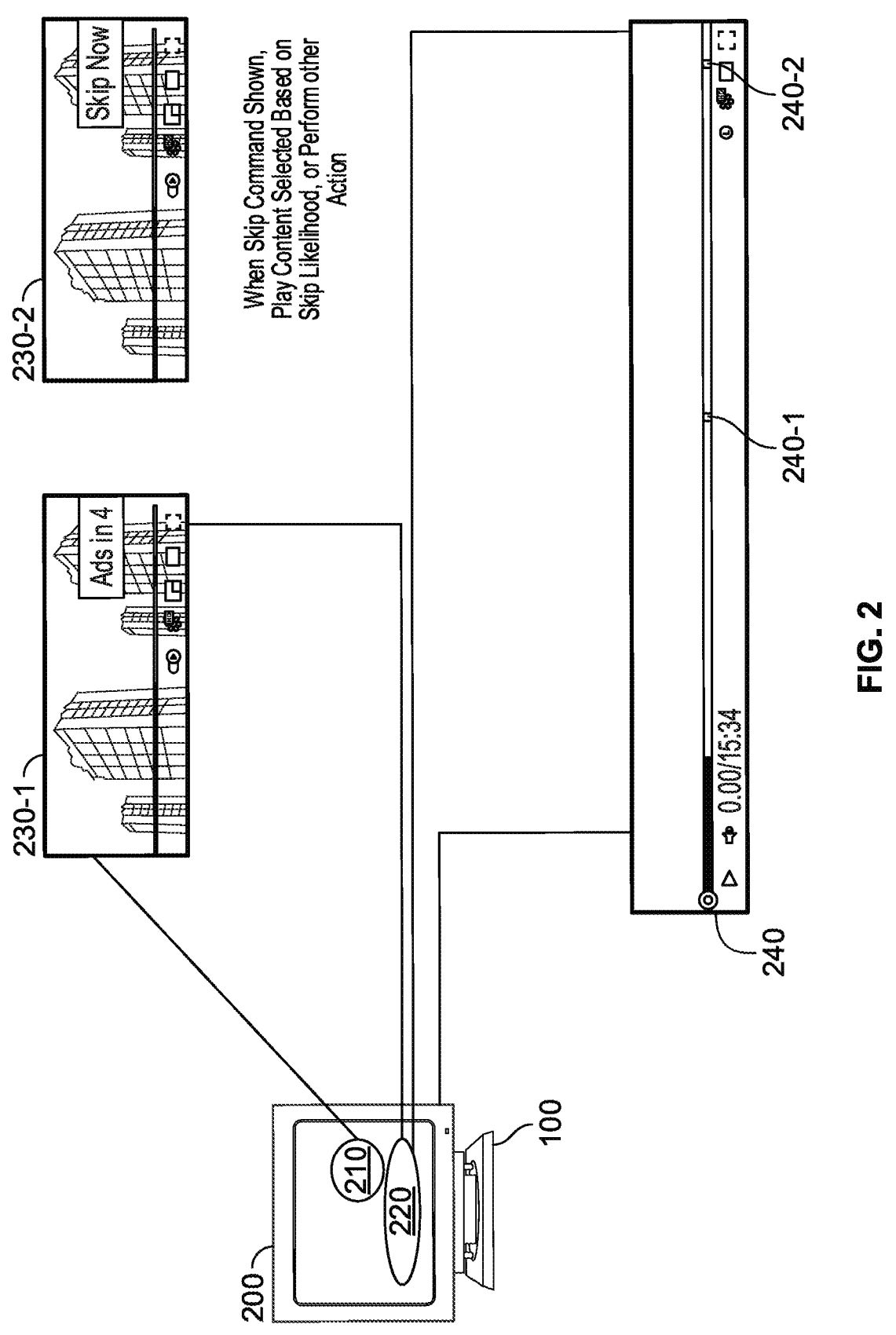
FIG. 2 illustrates one method for determining a likelihood of skipping supplemental content, in accordance with some embodiments of the disclosure.

Processing unit 120 may determine the likelihood that viewer 140 will skip supplemental content, in any manner. FIG. 2 conceptually illustrates one method for determining a likelihood of skipping supplemental content, in accordance with embodiments of the disclosure. In particular, movement of a cursor over an ad insertion countdown, a position of a "Skip Ad" icon prior to the icon being "active" or able to be clicked on, and/or other UI element shortly before or after an ad is played may indicate that the viewer 140 is preparing to and likely to skip or otherwise avoid viewing/listening to the upcoming ad. Here, display 200 projects or displays content, such as a movie or show, and may also concurrently or upon selection display one or more of an ad insertion countdown, a skip ad countdown, or a "Skip Ad" button in a section 210 of the display area, as well as a progress bar 240 in section 220 of the display area.

In some embodiments, a "Skip Ad" button or other UI element may appear in a lower right-hand portion 230-1 of the display area, which is grayed out and not selectable but which informs the viewer 140 that it will soon be possible to skip an upcoming ad. At a predetermined time, for instance, after an ad insertion countdown has expired, the preselected ad begins to be played, and a skip ad countdown has expired, the "Skip Ad" button becomes active so that portion 230-2 of the display changes to a "Skip Now" or other button that allows users to select it in order to skip the currently playing ad. Thus, if viewer 140 moves a cursor over the "Skip Ad" button of portion 230-1 prior to it becoming active, this may indicate that the viewer 140 intends to skip the upcoming supplemental content. Similarly, if viewer 140 moves his or her cursor over the "Skip Now" button of portion 230-2 once it is active, this may also indicate that viewer 140 intends to skip the supplemental content that is currently being played.

In some embodiments, the "Skip Now" button may include or be preceded by a skip countdown timer, such as "Skip in X" where X may be, e.g., any predetermined number of seconds until a "Skip Now" button is shown and made active. This alerts viewers to an upcoming time at which they may skip supplemental content. As with the "Skip Ad" button, if viewer 140 moves a cursor over the "Skip in X" button, this may indicate intent to press or select the "Skip Now" button when it becomes active, thus skipping the supplemental content. In some embodiments of the disclosure, an ad insertion countdown may be displayed, the preselected ad begins to be played at the expiration of the ad insertion countdown, a skip countdown timer may then be displayed, followed by a "Skip Now" or other button once the skip countdown timer expires, where skip likelihood may be determined during the ad insertion countdown and/or the skip countdown period.

In some embodiments of the disclosure, the skip countdown timer may not be displayed, with only a "Skip Now" or other button being shown once skip operations are permitted. In some other embodiments, neither the skip countdown timer nor a "Skip Now" or other button may be displayed, with play of the supplemental content simply beginning at the commencement of the supplemental content time slot, such as when non-skippable supplemental content is played. In further embodiments of the disclosure, some supplemental content slots may be automatically skipped, in which case a notice such as a countdown may be displayed indicating a countdown until an automatic skip occurs. This notice of an upcoming automatic skip may be displayed for viewers to see, or alternatively no notice may be displayed and supplemental content may simply be skipped automatically. In some embodiments, automatic skipping may occur at times in response to a determination of skip likelihood. That is, systems of embodiments of the disclosure may automatically skip supplemental content for a user when it is deemed that he or she is going to skip the supplemental content anyway.

In some embodiments, progress bar 240 may be displayed, and may also indicate the slots within content at which ads will be played. In this case, as play of content approaches either ad slot 240-1 or 240-2, movement of a cursor near the portion 210 of the display area at which the "Skip Now" icon will appear may indicate intent to skip the upcoming supplemental content. That is, movement of a cursor into portion 210 when a supplemental content slot 240-1 or 240-2 is approaching, even if no "Skip Ad" icon has appeared yet, may be used to indicate likely intent to skip upcoming supplemental content.

Figure 3:
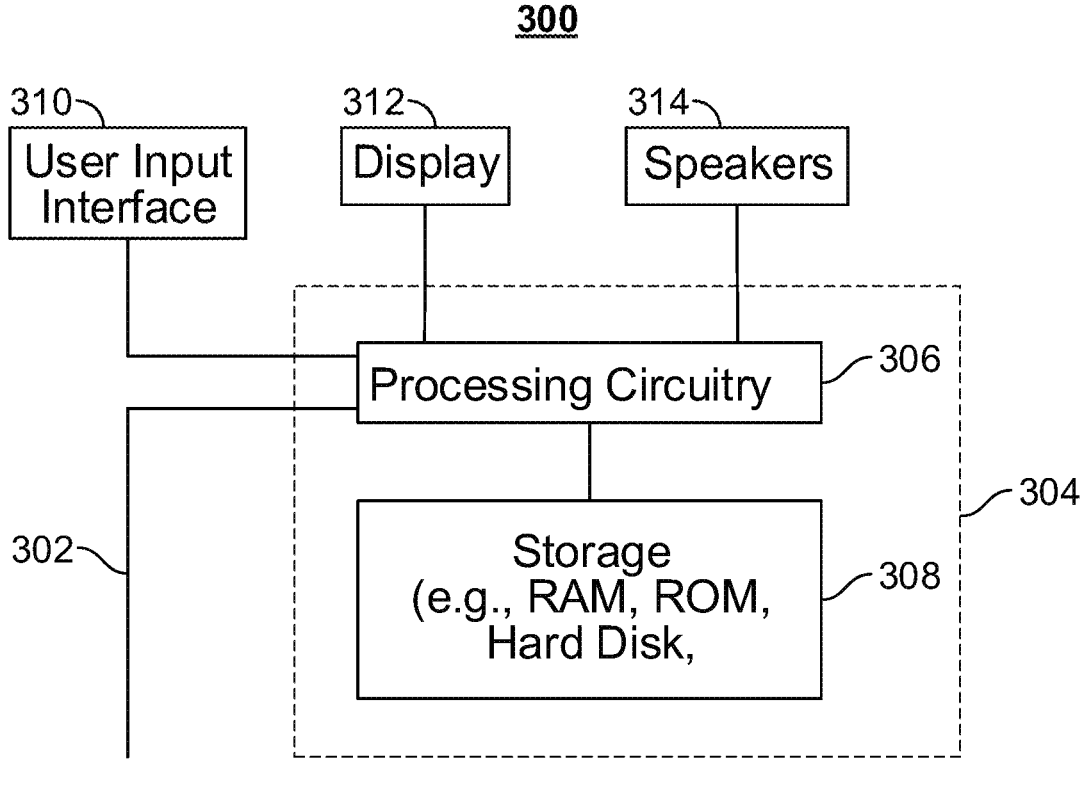
FIG. 3 is an embodiment of illustrative electronic computing devices constructed for use according to some embodiments of the disclosure.

FIG. 3 shows an embodiment of an illustrative user equipment device 300 that may serve as a display 100 and/or processing unit 120. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers to stream and display content on display 312.

Control circuitry 304 may thus include communications circuitry suitable for communicating with trailer generation server 220, content server 230, or any other networks or servers. Communications circuitry may include a cable modem, an integrated services digital network (ISDN) modem, a digital subscriber line (DSL) modem, a telephone modem, an Ethernet card, or a wireless modem for communication with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308, which is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Storage 308 may also store instructions or code for an operating system and any number of application programs to be executed by the operating system. In operation, processing circuitry 306 retrieves and executes the instructions stored in storage 308, to run both the operating system and any application programs started by the user. The application programs can include one or more content display applications that implement an interface allowing users to select and display content on display 312 or another display.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch-screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
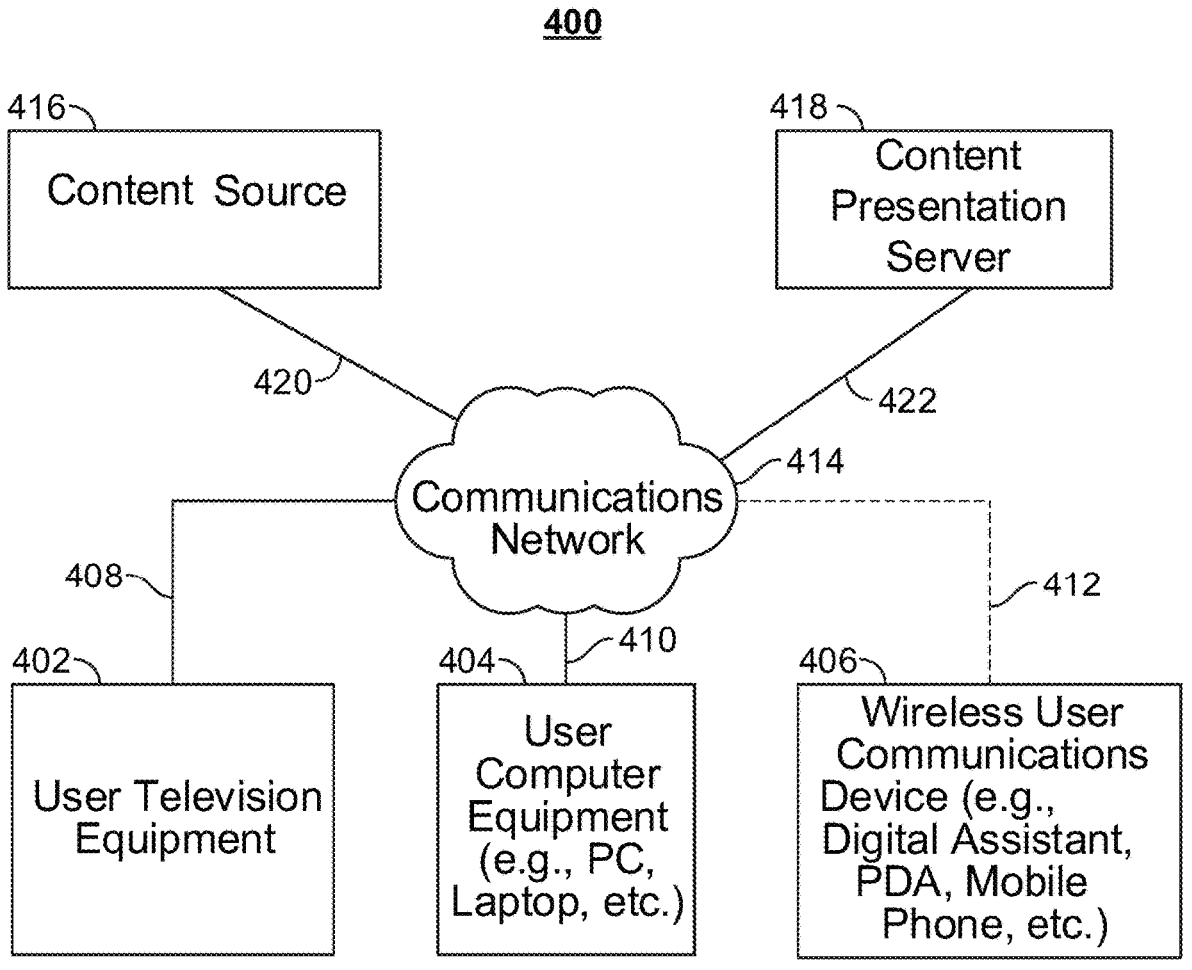
FIG. 4 is an embodiment of an illustrative system for selecting supplemental content according to skip likelihood, constructed for use according to some embodiments of the disclosure.

FIG. 4 is an embodiment of an illustrative system for selecting supplemental content according to skip likelihood, constructed for use according to embodiments of the disclosure. Device 300 of FIG. 3 can be implemented in system 400 of FIG. 4 as user television equipment 402, user computer equipment 404, a wireless user communications device 406, or any other type of user equipment suitable for determining skip likelihood and selecting supplemental content accordingly. For example, device 300 may be incorporated into display 100, e.g., television 402. User equipment devices may be part of a network of devices. Various network configurations of devices may be implemented and are discussed in more detail below.

In system 400, there is typically more than one of each type of user equipment device but only one of each is shown in FIG. 4 to avoid overcomplicating the drawing. In addition, each user may utilize more than one type of user equipment device and more than one of each type of user equipment device.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1494 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 also includes content source 416, and content presentation server 418. The content source 416 represents any computer-accessible source of content, such as a storage for the movies, advertisements, and metadata. The content source 416 may be or include the supplemental content storages 110-1 and 110-2 as well as user profile storage 130 of FIG. 1. The content presentation server 418 may store and execute various software modules for implementing the skip likelihood determination and supplemental content selection functionality described herein.

Figure 5:
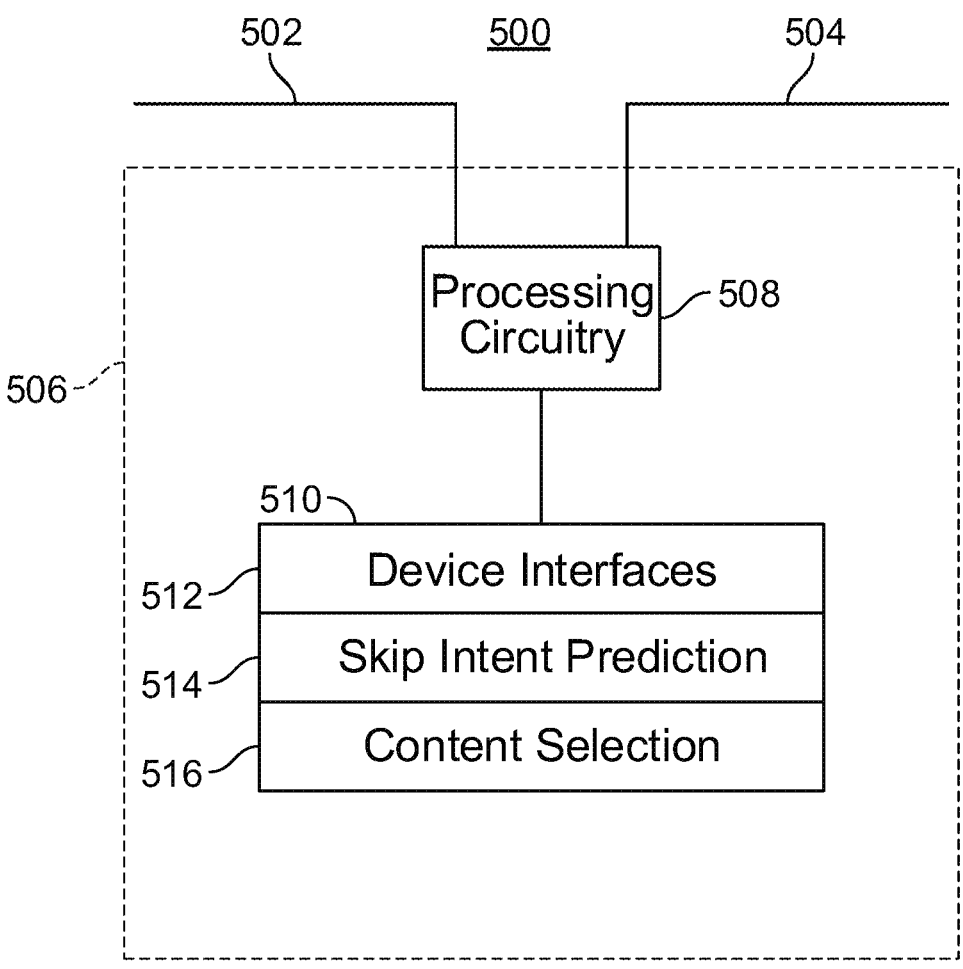
FIG. 5 is an embodiment of an illustrative content server constructed for use according to some embodiments of the disclosure.

FIG. 5 is an embodiment of an illustrative content server 230 constructed for use according to some embodiments of the disclosure. Here, device 500 may serve as a content server. Device 500 may receive content and data via I/O paths 502 and 504. I/O path 502 may provide content and data to the various devices 200 and/or server 220, while I/O path 504 may provide data to, and receive content from, content database 240. Like the device 400, the device 500 has control circuitry 506, which includes processing circuitry 508 and storage 510. The control circuitry 506, processing circuitry 508, and storage 510 may be constructed, and may operate, in a similar manner to the respective components of device 400.

Storage 510 is a memory that stores a number of programs for execution by processing circuitry 508. In particular, storage 510 may store a number of device interfaces 512, a skip intent prediction module 514 for determining the likelihood of viewers skipping supplemental content, and content selection module 516 for selecting supplemental content upon determination of skip likelihood. The device interfaces 512 are interface programs for handling the exchange of commands and data with the various devices 200.

Any of the various modules and functions described herein may reside on any one or more devices. For example, skip intent prediction functionality may reside on display 100, or a remote server such as content presentation server 418.

Figure 6:
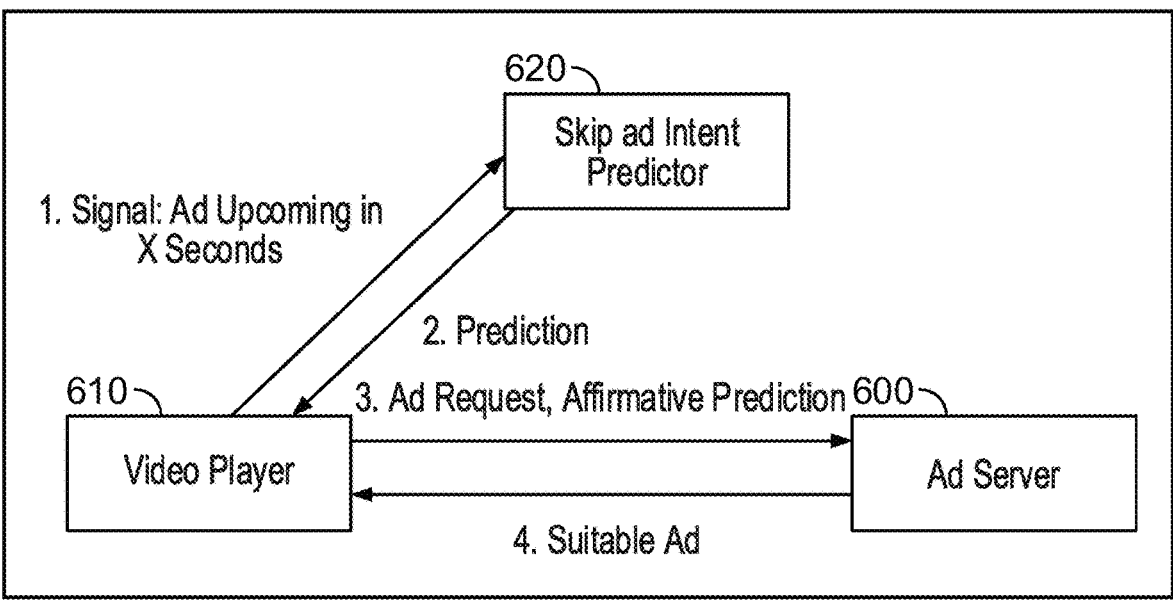
FIG. 6 and FIG. 7 conceptually illustrate determination of a likelihood of skipping supplemental content, in accordance with some embodiments of the disclosure.
Figure 7:
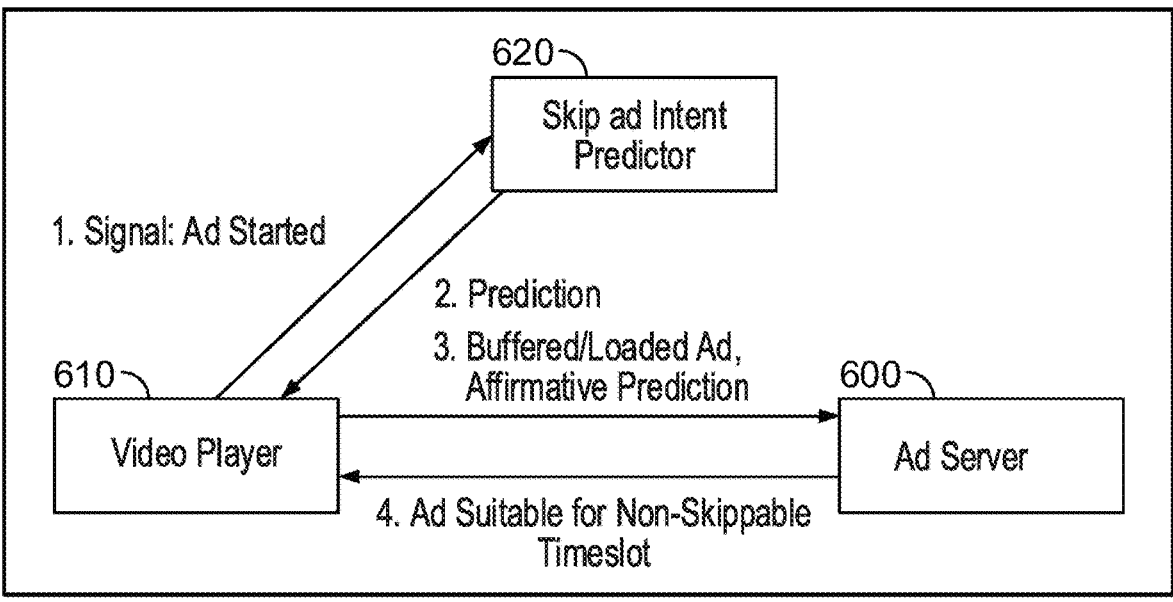

FIG. 6 and FIG. 7 conceptually illustrate determination of a likelihood of skipping supplemental content, in accordance with embodiments of the disclosure. FIG. 6 illustrates skip likelihood determination prior to display of supplemental content such as an advertisement. Here, a video player 610 such as display 100 may communicate with a supplemental content server 600 such as content presentation server 418, and with a skip ad intent predictor 620. Skip ad intent predictor 620 may be a module residing on content presentation server 418, or may reside in any other device such as display 100. Video player 610 may signal to skip supplemental content intent predictor 620 that a supplemental content item is upcoming at a specified time, perhaps in conjunction with display of a "Skip Ad" or other icon or UI element. The skip supplemental content intent predictor 620 receives inputs such as user actions, cursor locations from video player 610 or another device such as controller 160, user motion or position information from camera 150, or any other suitable inputs. From these inputs, skip supplemental content intent predictor 620 determines skip supplemental content likelihood, or whether the viewer 140 is likely to skip the upcoming supplemental content. The resulting prediction is transmitted to video player 610, which may request a supplemental content item according to whether the viewer 140 is likely to attempt to skip the supplemental content or not. The video player 610 may, for example, transmit a request to supplemental content server 600 for a particular supplemental content, for a supplemental content item meeting certain criteria, or may simply transmit the skip likelihood if the ad server 600 is configured to select supplemental content accordingly. Supplemental content server 600 may then return a suitable supplemental content item to video player 610, for display to the viewer 140.

FIG. 7 illustrates skip likelihood determination after display of supplemental content such as an advertisement has already begun. Here, video player 610 may signal to skip supplemental content intent predictor 620 that supplemental content has already begun, perhaps in conjunction with display of an active "Skip Ad" or other icon or UI element. As in FIG. 6, skip supplemental content intent predictor 620 also receives inputs such as user actions, cursor locations from video player 610 or another device such as controller 160, user motion or position information from camera 150, or any other suitable inputs. From these inputs, skip supplemental content intent predictor 620 determines skip supplemental content likelihood, or whether the viewer 140 is likely to skip the currently playing supplemental content. The resulting prediction is transmitted to video player 610, which may continue to play the currently playing supplemental content, or request another supplemental content item according to whether the viewer 140 is likely to attempt to skip the supplemental content or not. The video player 610 may, for example, transmit a request to supplemental content server 600 for a particular supplemental content item or for supplemental content meeting certain criteria, or may simply transmit the skip likelihood if the supplemental content server 600 is configured to select supplemental content accordingly. Supplemental content server 600 may then return a suitable supplemental content item to video player 610, for display to the viewer 140. As an example, supplemental content server 600 may return a short supplemental content item, supplemental content whose message is conveyed in its initial frames, or supplemental content suitable for a non-skippable time slot. This latter case may occur when, for instance, the video player 610 designates the supplemental content slot as non-skippable in response to a determination that the user is likely to attempt to skip the supplemental content, preventing the viewer 140 from skipping the supplemental content. As another example, video player 610 may buffer the currently playing supplemental content and, upon skip likelihood, may show key frames of the buffered supplemental content instead of the full supplemental content, skip to the end of the supplemental content, or the like. As a further example, video player 610 may retrieve or buffer two supplemental content items, one suitable for a likely skip, and switch to playback of this skip-suitable supplemental content item once skip likelihood is determined.

Figure 8:
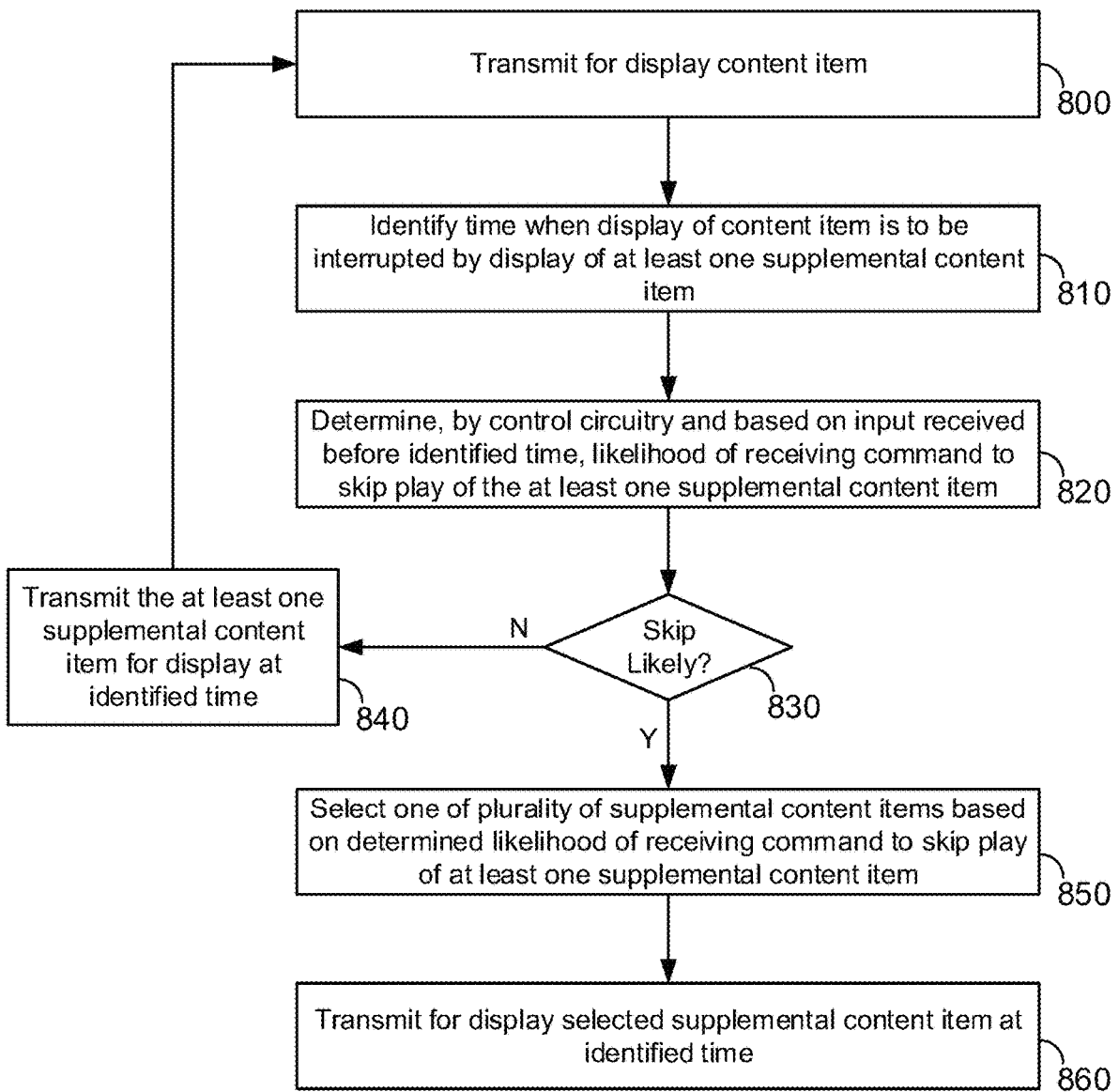
FIG. 8 is a flowchart illustrating processing steps for selecting supplemental content according to skip likelihood, in accordance with some embodiments of the disclosure.

FIG. 8 is a flowchart illustrating processing steps for selecting supplemental content according to skip likelihood, in accordance with some embodiments of the disclosure. Here, the process begins with the content presentation server 418 transmitting a content item such as a movie for display on, e.g., display 100 (Step 800). During display of the content item, supplemental content slots may be designated for breaks in display of the content item, e.g., movie, and corresponding display of supplemental content. Display 100 and/or content presentation server 418 may accordingly identify a time when display of the content item is to be interrupted by display of at least one supplemental content item (Step 810). Content presentation server 418 may then determine the likelihood of receiving a command to skip play of the supplemental content item (Step 820).

As above, skip likelihood may be determined in any manner, from any inputs. As one example, display 100 may transmit cursor position to content presentation server 418, and positioning of the cursor on a "Skip Ad" icon or UI element may indicate intent to skip. Further inputs may include viewer 140 position or actions, as detected by camera 150. For instance, camera 150 may capture images of viewer 140 grasping controller 160, indicating an intent to use the controller 160 to skip supplemental content. Camera 150 may also capture images of viewer 140 performing certain gestures or actions characteristic of an intent to skip supplemental content, such as a waving of a hand, pointing to a portion of display 100 corresponding to a "Skip Ad" icon, or the like. Content presentation server 418 may receive these images from camera 150 and be programmed to recognize these gestures, actions, or motions. Recognition of gestures, actions, motions, and the like may be accomplished in any manner, such as by comparison of input mages to a database of labeled images of such gestures, actions, and motions. Alternatively, server 418 may execute one or more machine learning models such as convolutional neural networks or the like, which are trained to recognize input images or video as constituting certain gestures, actions, or motions. Such machine learning models are known. Training of such models may be performed by input of images and/or video labeled as corresponding to specific gestures, motions, or actions.

Content presentation server 418 may also receive voice or other input from viewer 140, such as via microphones of display 100 or another device, containing commands to skip upcoming supplemental content. Server 418 may execute one or more known natural language processing modules to convert input speech to text, and to recognize skip commands in this text.

Content presentation server 418 may also receive input from controllers such as controller 160, where certain such inputs may indicate skip likelihood. For example, controller 160 detection of pressure applied by viewer 140 upon any buttons may indicate an intent to press one of the buttons to command display 100 to skip supplemental content. Detected controller 160 motion may also indicate that it has been picked up by viewer 140 to skip supplemental content.

Server 418 may additionally retrieve information on viewer 140 from user profile storage 130, where the retrieved information is indicative of a skip history of viewer 140. For example, retrieved information may include data such as the frequency with which users have skipped advertisements or other supplemental content in the past, and information on supplemental content skipped and not skipped, such as the lengths or other attributes of skipped content. Information may also include metadata of previously viewed supplemental content that may indicate attributes such as product types whose ads were skipped, brands whose ads were skipped and not skipped, skipped content genres or other subject matter, times of day ads were skipped, positions within displayed content at which ads were skipped or not skipped, and the like. Stored user information may include any type and quantity of information that may help indicate a skip likelihood.

Skip likelihood may be determined in any manner from the above inputs. As one example, skip likelihood may be a binary quantity (skip likely/not likely), with the above inputs contributing to determination of this binary quantity in any manner. In some embodiments, skip likelihood may be found if the presence of any of the above inputs occurs, or if more than a predetermined number of inputs occur. In other embodiments, each input may be assigned a numerical value, and the values of any inputs present at a given time may be summed. When this sum exceeds some predetermined value, skip likelihood is found. As another example, skip likelihood may be a numerical value such as a percentage rather than a binary quantity, with each input assigned a numerical value such as a percentage. Accordingly, the sum of the values for any inputs present at a given time may represent the aggregate percentage skip likelihood. Skip likelihood may be found when this aggregate percentage exceeds some predetermined threshold value, e.g., >50% or >60%. Any suitable threshold value may be used. Additionally, any of the above quantities may have any suitable numerical value.

Once skip likelihood is determined, server 418 determines whether it is likely that the viewer 140 intends to skip supplemental content (Step 830), such as upon a determination of binary skip likely, or a skip likelihood value that exceeds some threshold value, e.g., 50%. If server 418 finds that the user likely does not intend to skip content (skip not likely), server 418 transmits supplemental content for display at the identified time (Step 840). That is, for example, server 418 transmits its ad as originally intended, at the intended time. If on the other hand skip likelihood is found, server 418 may select one of a plurality of supplemental content items based on this likelihood (Step 850). As above, server 418 may select supplemental content that conveys its intended message rapidly, such as short supplemental content, still frames of a product, supplemental content with product information and/or appealing images in its first few frames, or the like. Server 418 may then transmit this selected supplemental content for display (Step 860).

Figure 9:
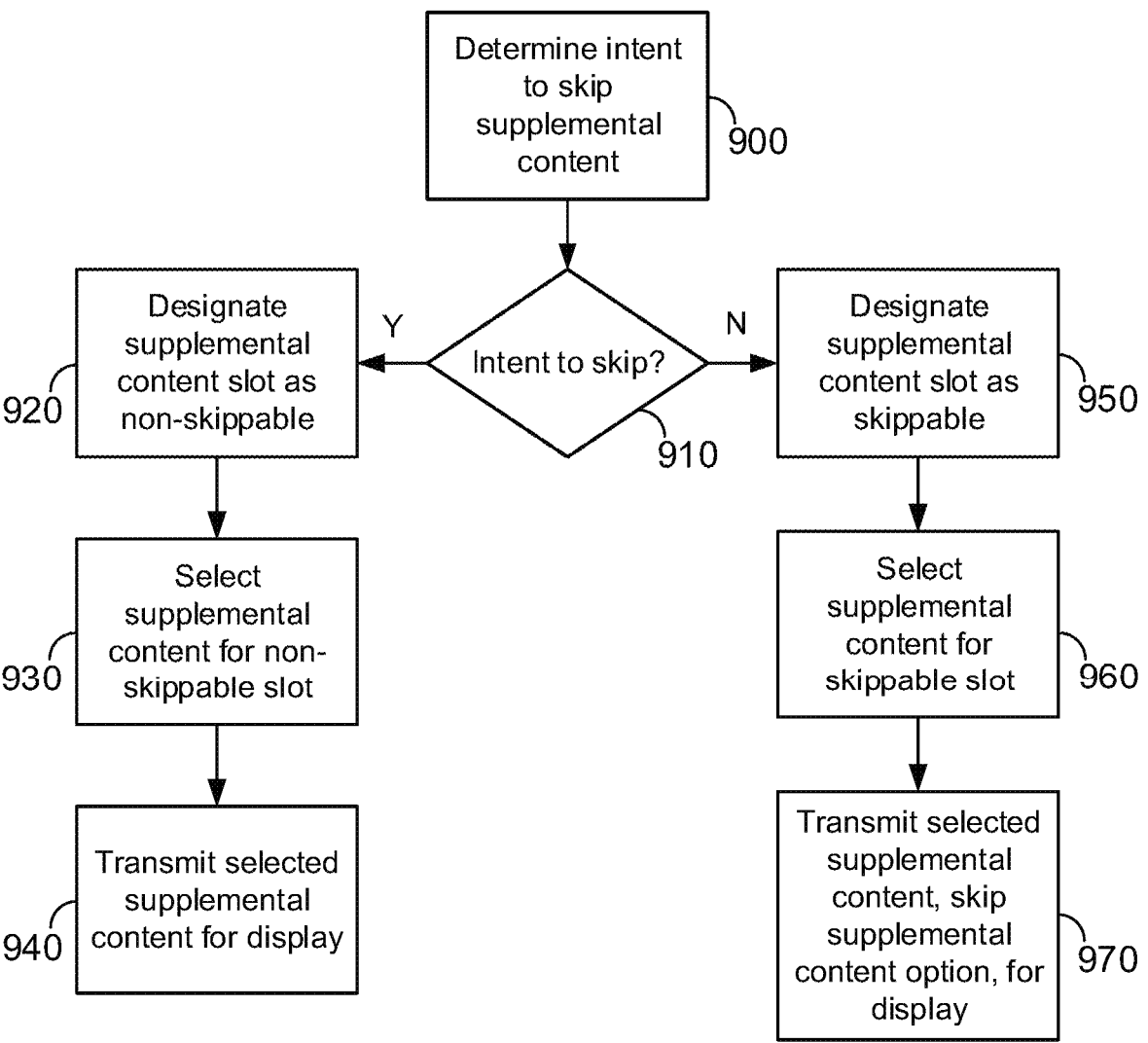
FIG. 9 and FIG. 10 are flowcharts illustrating processing steps for reacting to a likelihood of skipping supplemental content, in accordance with some embodiments of the disclosure.
Figure 10:
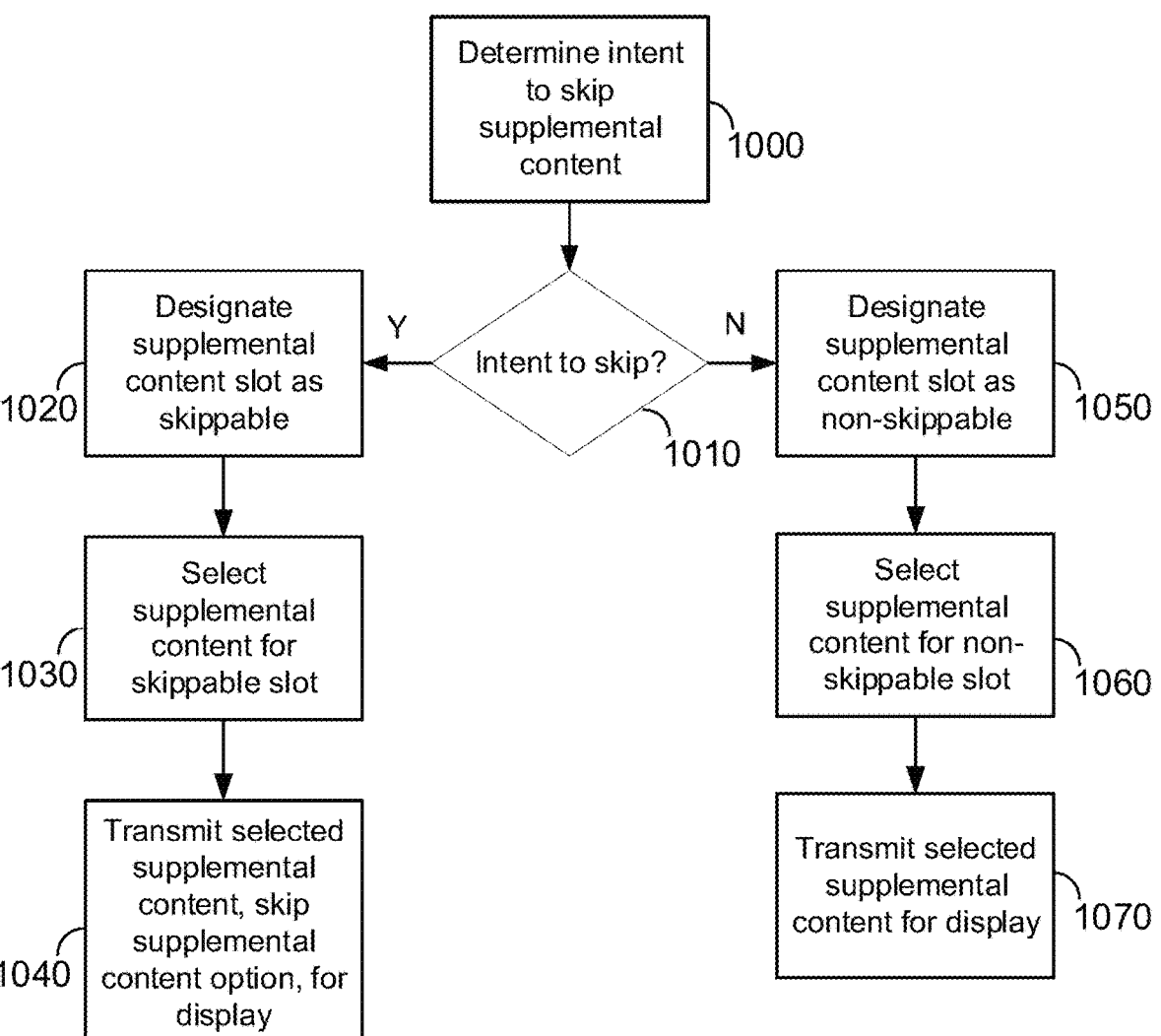

In addition to selecting certain supplemental content based on skip likelihood, server 418 may also designate supplemental content slots as skippable or non-skippable according to skip likelihood. FIG. 9 and FIG. 10 are flowcharts illustrating processing steps for reacting to a likelihood of skipping supplemental content, in accordance with some embodiments of the disclosure. FIG. 9 illustrates reaction to skip likelihood that may be preferred by a supplemental content creator or distributor, for example. More specifically, server 418 may determine an intent to skip supplemental content (Step 900), such as by determining a skip likelihood exceeding a threshold value, for a particular supplemental content slot. A check may be made for the determined intent to skip (Step 910). If a likely intent to skip is found, for instance, by monitoring input(s) (e.g., cursor position, eye gaze, button pressure, hand movement, controller movement, etc.) during an ad insertion countdown and/or at other times, server 418 may designate this supplemental content slot as non-skippable (Step 920), preventing the viewer 140 from skipping the supplemental content even if he or she may wish, and intend, to do so. Supplemental content may then be selected for this non-skippable slot (Step 930), and transmitted for display (Step 940).

Conversely, if a likelihood of no skip is found, server 418 may designate the supplemental content slot as skippable (Step 950), perhaps aiding in fulfilling a quota or requirement for designating a certain number of content slots as skippable while still maintaining a likelihood that the viewer 140 views the supplemental content. Server 418 may then select supplemental content for this slot (Step 960), where this supplemental content may be selected with knowledge that a skip is unlikely, allowing for selection of supplemental content as desired. The selected supplemental content may then be transmitted for display, along with an interface element presenting the viewer with, e.g., a skip supplemental content countdown followed by the option to skip (Step 970). Thus, from the perspective of a supplemental content creator or distributor who may wish for their content to be viewed, supplemental content slots may be designated non-skippable when viewers are likely to attempt to skip that content, so as to force viewers to view the supplemental content. Similarly, supplemental content slots may be designated as skippable when viewers are unlikely to attempt to skip that content, as they are likely to view (i.e., unlikely to skip) the content anyway.

FIG. 10 illustrates reaction to skip likelihood that may be preferred by viewers, for example. Here, server 418 may determine an intent to skip supplemental content (Step 1000), such as by determining a skip likelihood exceeding a threshold value, for a particular supplemental content slot. A check may be made for the determined intent to skip (Step 1010). If a likely intent to skip is found, for instance, by monitoring input(s) (e.g., cursor position, eye gaze, button pressure, hand movement, controller movement, etc.) during an ad insertion countdown and/or at other times, server 418 may designate this supplemental content slot as skippable (Step 1020), consistent with the user's wish and intent to skip the content. Supplemental content may then be selected for this skippable slot (Step 1030), such as by selection of supplemental content that conveys its message rapidly, due to the likelihood of the supplemental content being skipped at least in part. The selected supplemental content may then be transmitted for display, perhaps along with an interface element presenting the viewer with a skip supplemental content countdown followed by the option to skip (Step 1040).

Conversely, if a likelihood of no skip is found, server 418 may designate the supplemental content slot as non-skippable (Step 1050). In this manner, viewers who typically wish for minimal exposure to supplemental content (e.g., few ads) are allowed to skip supplemental content when they express a desire for doing so, and may also view this supplemental content when they wish to do so. Supplemental content may then be selected for this non-skippable slot (Step 1060) and transmitted for display (Step 1070), where selection may occur in any manner to select any desired content, as it will likely be viewed in its entirety.

Figure 11:
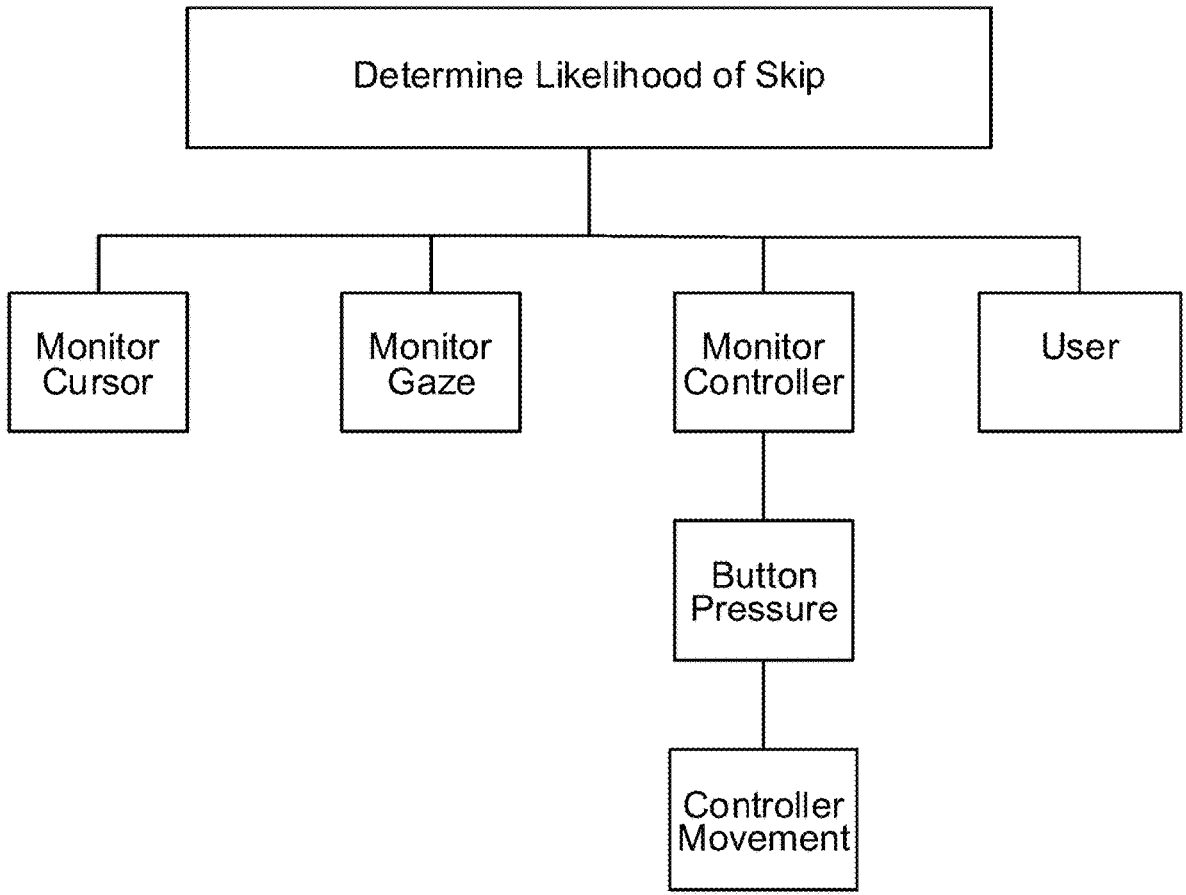
FIG. 11 conceptually illustrates exemplary inputs for determining a likelihood of skipping supplemental content, in accordance with some embodiments of the disclosure.

FIG. 11 illustrates exemplary inputs for determining a likelihood of skipping supplemental content, in accordance with some embodiments of the disclosure. Any inputs may be employed to determine skip likelihood. In some embodiments, these inputs may include cursor position on display 100, eye gaze, controller 160 and sensors therein, and user information. As above, cursor position may indicate skip likelihood, such as when the cursor is placed over a "Skip Ad" icon prior to or after its activation, or placed at the location the "Skip Ad" icon will soon appear. Eye gaze directed at the "Skip Ad" icon prior to or after its activation, or directed at the location the "Skip Ad" icon will soon appear, may similarly indicate skip likelihood.

In some embodiments, the cursor position may indicate skip likelihood, such as when the cursor is placed over some other UI element that provides a control to, for example, close a browser tab in which the content item is being displayed, select a different browser tab from the browser tab in which the content item is being displayed, select a different content item in a playlist, and/or mute audio of the content item or browser tab in which the content item is being displayed.

Inputs from controller 160 may also indicate skip likelihood, with some illustrative examples being button pressure, e.g., a user partially or fully depressing any controller button, and controller 160 movement, both indicating preparation to use the controller 160 to skip supplemental content. Additionally, user information describing past skip behavior of a user may indicate skip likelihood in that, for example, current user behavior consistent with past behavior that led to a skip command may indicate skip likelihood. Thus, for example, skip likelihood may be found when users are presented with the same genre ad, or ads for the same product, that they have consistently skipped in the past. Any one or more of these inputs may be used to determine skip likelihood, in any manner.

As above, skip likelihood may be determined in any manner from any one or more of the factors listed in FIG. 11. As one example, each factor may be assigned a numerical likelihood value, which may be any function of user actions, and which may be any values. For instance, a 20% likelihood may be assigned to every 2-second span at which a cursor is placed over a "Skip Ad" button or other UI element. Thus, placing a cursor over a "Skip Ad" button for longer than 10 seconds may generate a 100% likelihood that the viewer 140 intends to skip upcoming supplemental content. Similarly, placing a cursor over the "Skip Ad" button for only 2 seconds may generate a 20% likelihood of skip. The same values may be assigned to eye gaze duration directed at the "Skip Ad" button or its position on the display area. Thus, for instance, moving the cursor over the "Skip Ad" button for 4 seconds, with corresponding eye gaze also directed at the area of the "Skip Ad" button for the same 4 seconds, may result in a determination of 40%+40%=80% skip likelihood.

Similarly, controller movement and button pressure may each be assigned, e.g., 50% if a "Skip" button is partially depressed, 30% if any other button is partially depressed, and 20% upon controller movement once the "Skip Ad" button or other notice appears. In this case, if a user picks up a controller and partially depresses a button other than a skip button (e.g., when the controller has no skip button) within the time the user is notified of an upcoming skip opportunity, a 20%+30%=50% skip likelihood may be assigned, whereas if the controller has a skip button and it is partially depressed, a 20%+50%=70% likelihood of skip is assigned.

User information may also be assigned skip likelihood values, e.g., 20% if upcoming supplemental content matches a genre that is often (e.g., >50% of the time historically) skipped by the viewer, or 30% if the upcoming supplemental content concerns a product or brand that is often (e.g., >50%) skipped by the viewer. Thus, for example, if a viewer picks up his or her controller once a skip opportunity appears, and the upcoming supplemental content relates to a product that is often skipped by the viewer, a 20%+50%=70% skip likelihood may be determined.

Figure 12:
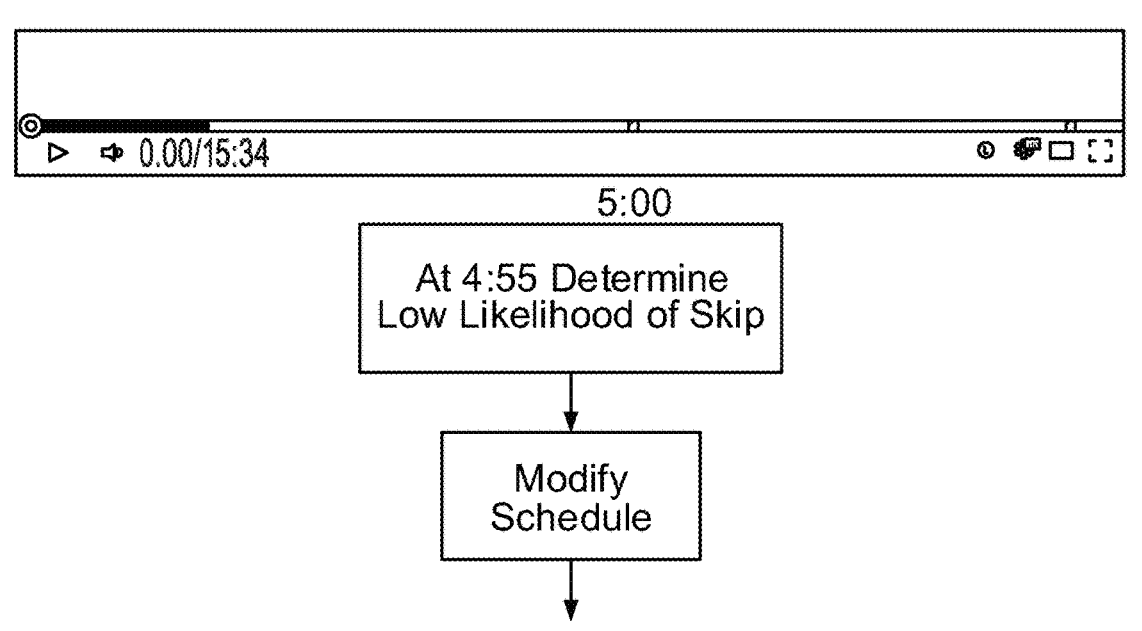
FIG. 12 illustrates exemplary actions performed in response to a likelihood of skipping supplemental content, in accordance with some embodiments of the disclosure.

FIG. 12 illustrates exemplary actions performed in response to a likelihood of skipping supplemental content, in accordance with some embodiments of the disclosure. Similar to FIGS. 9 and 10, FIG. 12 illustrates re-designation of supplemental content slots as skippable or non-skippable responsive to a determination of skip likelihood. In the example of FIG. 12, a content item is assigned four different ad slots, at 5, 10, 15, and 25 minutes into the content, respectively. These four ad slots are initially designated as skippable, non-skippable, skippable, and non-skippable, respectively. That is, viewers are allowed to skip the first and third ad slots, but are unable to skip either of the second or fourth ad slots.

At the 4:55 mark, server 418 may determine a low skip likelihood for the upcoming 5-minute ad slot. Server 418 may accordingly modify the ad slot schedule as follows: the four different ad slots are re-designated, in order, as non-skippable, skippable, skippable, and non-skippable. In this manner, the first (5-minute) ad slot is redesignated as non-skippable as the ad slot is likely to be viewed anyway, which is beneficial from the perspective of a viewer, as it preserves skippable ad slots for later slots that the viewer may wish to skip. In this manner, ad slots may be re-designated as skippable or non-skippable on the fly according to user skip intent, to better serve the interests of various parties as desired.

Figure 13:
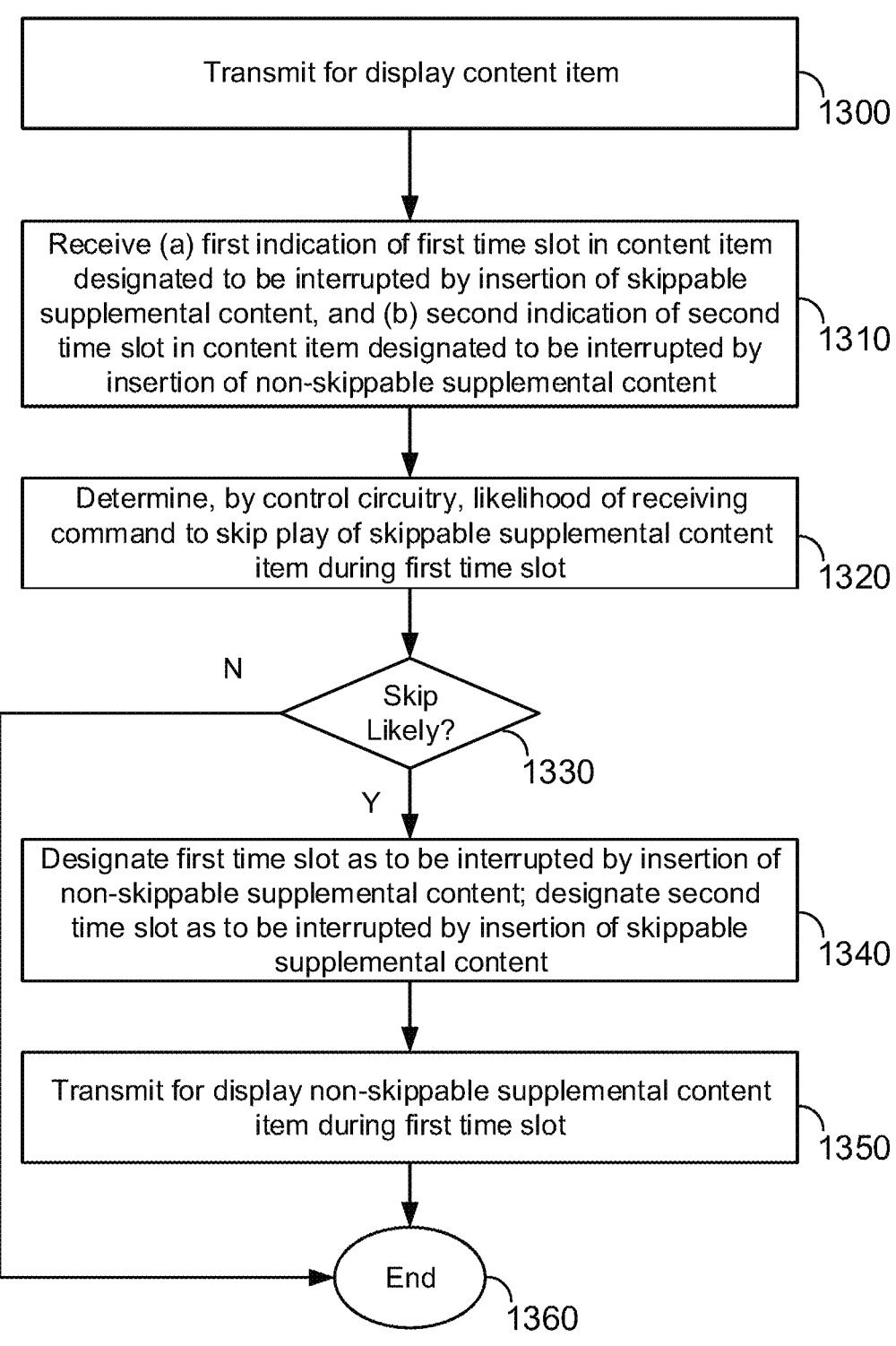
FIG. 13 is a flowchart illustrating processing steps for reacting to a likelihood of skipping supplemental content, in accordance with further embodiments of the disclosure.

FIG. 13 is a flowchart illustrating processing steps for reacting to a likelihood of skipping supplemental content, in accordance with further embodiments of the disclosure. As in FIGS. 9-10, skip likelihood may be employed to determine whether a supplemental content slot is to be designated skippable or non-skippable. Similar to the process of FIG. 8, the process of FIG. 13 begins with the content presentation server 418 transmitting a content item such as a movie for display on display 100 (Step 1300), for example. During display of the content item, supplemental content slots may be designated for breaks in display of the content item, e.g., movie, and corresponding display of supplemental content. Display 100 and/or content presentation server 418 may accordingly identify a time when display of the content item is to be interrupted by display of at least one supplemental content item. More specifically, display 100 and/or server 418 may receive an indication of a first time slot designated for interruption of the displayed content and play of skippable supplemental content, as well as an indication of a second time slot designated for interruption of the displayed content and play of a non-skippable supplemental content item (Step 1310). That is, display 100 and/or server 418 may receive indications of an upcoming skippable time slot and a later non-skippable time slot, e.g., two future supplemental content slots, one skippable and one non-skippable. Content presentation server 418 may then determine the likelihood of receiving a command to skip play of the supplemental content item (Step 1320).

If a skip is deemed likely (Step 1330), server 418 may designate the upcoming supplemental content slot as either skippable or non-skippable, in response to the determined likelihood of receiving a command to skip supplemental content. As in FIGS. 9-10, a supplemental content slot may be designated as either skippable or non-skippable as desired. If, e.g., the interests of content creators or distributors are to be considered, server 418 may designate the upcoming supplemental content slot as non-skippable upon determination of skip likelihood, to prevent users from their intended skipping of supplemental content and force them to view it. In contrast, if viewer interests are to be considered, server 418 may instead designate the upcoming supplemental content slot as skippable upon determination of skip likelihood, to allow users to keep viewing their desired content and increase viewer interest and engagement. Accordingly, embodiments of the disclosure allow upcoming supplemental content slots to be designated, or re-designated, as skippable or non-skippable as desired.

In particular, if a skip is deemed likely, server 418 may re-designate the first or nearest upcoming time slot as non-skippable, and re-designate the next time slot as skippable (Step 1340). That is, the upcoming skippable time slot may be re-designated as skippable in response to the viewer intending to skip its supplemental content. To keep the number of skippable and non-skippable time slots generally constant, the following time slot is then re-designated as skippable, although this step is optional.

After designation or re-designation of the upcoming supplemental content slot as either skippable or non-skippable, server 418 may transmit for display a supplemental content item for play during the supplemental content slot (Step 1350). The process may then terminate (Step 1360). If a skip is deemed not likely, the process may instead skip to Step 1360 without re-designation of any time slots from their original skippable or non-skippable designations. As above, server 418 may select this supplemental content according to determined skip likelihood, such as by selecting content that conveys its intended message quickly, still images, and the like, if skip likelihood is high and the supplemental content slot has been designated skippable. Conversely, if skip likelihood is deemed low or the supplemental content slot has been designated as non-skippable, supplemental content may be selected in any other manner, without regard to the speed at which an intended image or message is conveyed.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, skip likelihood may be determined in any manner from any inputs or combinations thereof. Any supplemental content may be selected in response to any determined skip likelihood, and any responsive actions may be taken. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
transmitting a content item for display on a user device;
identifying a time when the display of the content item is to be interrupted by display of a supplemental content item;
determining, by control circuitry and based on input received before the identified time, a likelihood of receiving a command to skip play of the supplemental content item based at least in part on:
detecting a body part of a user of the user device proximate to a position of the user device at which an interface element indicating an option to skip the supplemental content item is to be displayed with the supplemental content item; and
based on the determined likelihood of receiving the command to skip play of the supplemental content item, performing at least one of:
transmitting for display an alternative supplemental content item at the identified time instead of the supplemental content; or
transmitting for presentation a modified version of the supplemental content item at the identified time instead of the supplemental content item.

2. The method of claim 1, wherein the body part is a hand.

3. The method of claim 1, wherein the detecting the body part of the user of the user device proximate to the position of the user device further comprises detecting a gesture of a hand of the user of the user device pointing to the position of the user device.

4. The method of claim 1, wherein the transmitting for display the alternative supplemental content item further comprises:
if the determined likelihood exceeds a threshold, transmitting a first alternative supplemental content item from a plurality of supplemental content items; and
if the determined likelihood falls below the threshold, transmitting a second alternative supplemental content item from the plurality of supplemental content items.

5. The method of claim 1, wherein the likelihood is further based at least in part on one or more of a positioning of a cursor over the position of the user device at which the interface element is to be displayed, an eye gaze directed at the position of the user device at which the interface element is to be displayed, a hand positioned over a remote controller, or a pressure applied to a button of the remote controller.

6. The method of claim 1, wherein the modified version of the supplemental content item comprises the supplemental content item played at a higher speed.

7. The method of claim 1, wherein the modified version of the supplemental content item comprises a truncated version of the supplemental content item.

8. The method of claim 1, wherein the modified version of the supplemental content item comprises key frames of the supplemental content item.

9. The method of claim 1, further comprising:
retrieving profile information from a memory,
wherein the likelihood is further based at least in part on the retrieved profile information.

10. The method of claim 9, wherein the retrieved profile information comprises one or more of a skip history, previously viewed supplemental content items, metadata of the previously viewed supplemental content items, metadata of the supplemental content item, a brand identification, or a time of day.

11. A system comprising:
input/output circuitry configured to:
transmit a content item for display on a user device;
control circuitry configured to:
identify a time when the display of the content item is to be interrupted by display of a supplemental content item;
determine, based on input received before the identified time, a likelihood of receiving a command to skip play of the supplemental content item based at least in part on:
detect a body part of a user of the user device proximate to a position of the user device at which an interface element indicating an option to skip the supplemental content item is to be displayed with the supplemental content item; and
based on the determined likelihood of receiving the command to skip play of the supplemental content item, perform at least one of:
transmitting for display an alternative supplemental content item at the identified time instead of the supplemental content; or
transmitting for presentation a modified version of the supplemental content item at the identified time instead of the supplemental content item.

12. The system of claim 11, wherein the body part is a hand.

13. The system of claim 11, wherein the control circuitry is further configured to detect the body part of the user of the user device proximate to the position of the user device by detecting a gesture of a hand of the user of the user device pointing to the position of the user device.

14. The system of claim 11, wherein the control circuitry is further configured to transmit for display the alternative supplemental content item by:

if the determined likelihood exceeds a threshold, transmitting a first alternative supplemental content item from a plurality of supplemental content items; and if the determined likelihood falls below the threshold, transmitting a second alternative supplemental content item from the plurality of supplemental content items.

15. The system of claim 11, wherein the likelihood is further based at least in part on one or more of a positioning of a cursor over the position of the user device at which the interface element is to be displayed, an eye gaze directed at the position of the user device at which the interface element is to be displayed, a hand positioned over a remote controller, or a pressure applied to a button of the remote controller.

16. The system of claim 11, wherein the modified version of the supplemental content item comprises the supplemental content item played at a higher speed.

17. The system of claim 11, wherein the modified version of the supplemental content item comprises a truncated version of the supplemental content item.

18. The system of claim 11, wherein the modified version of the supplemental content item comprises key frames of the supplemental content item.

19. The system of claim 11, wherein the control circuitry is further configured to:

retrieve profile information from a memory, wherein the likelihood is further based at least in part on the retrieved profile information.

20. The system of claim 19, wherein the retrieved profile information comprises one or more of a skip history, previously viewed supplemental content items, metadata of the previously viewed supplemental content items, metadata of the supplemental content item, a brand identification, or a time of day.

* * * * *